March 4, 1924. 1,486,073
J. W. COATES
OIL SUPPLY AND DELIVERY APPARATUS
Filed Jan. 18, 1923 2 Sheets-Sheet 1
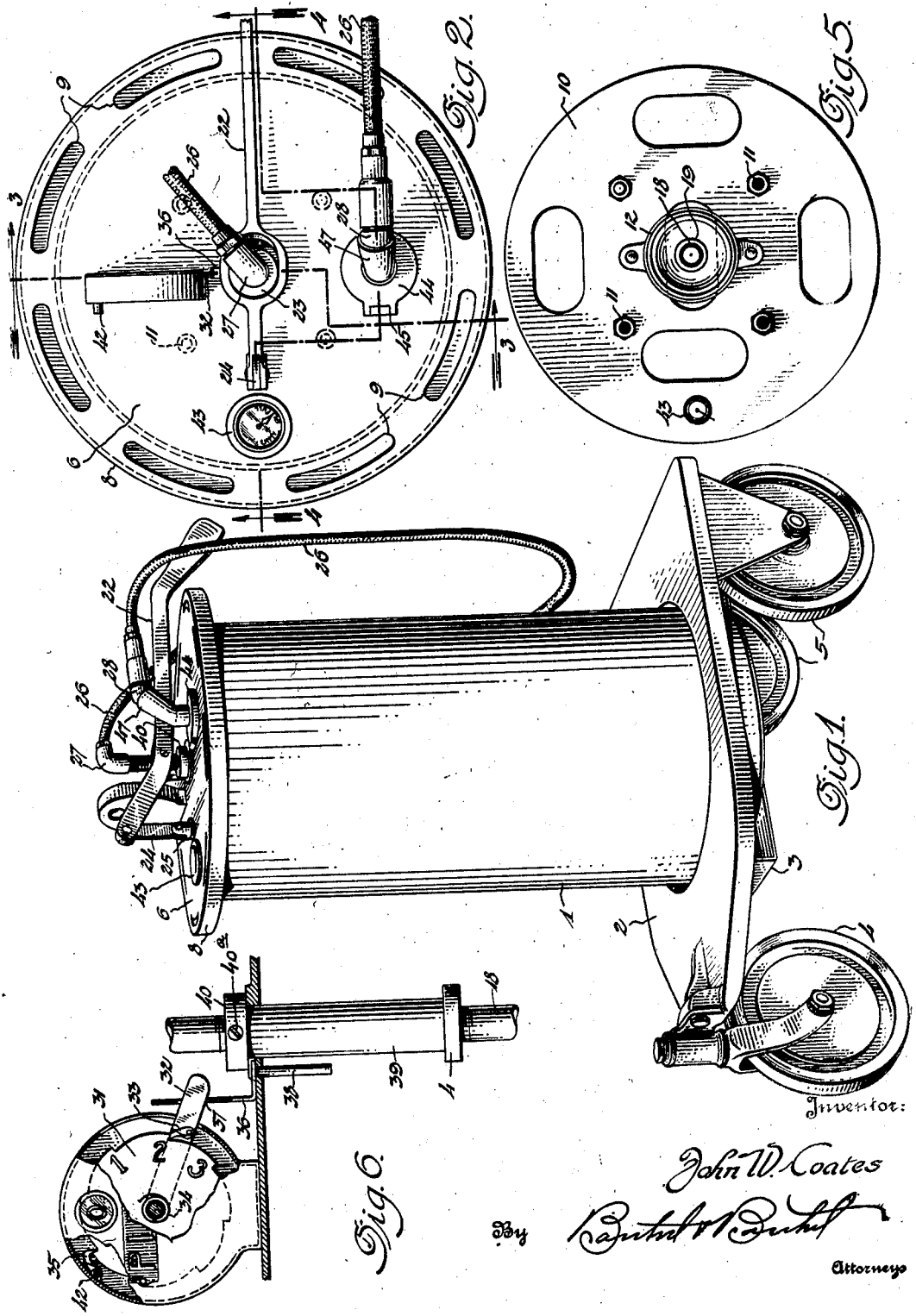
Inventor:
John W. Coates
By
Attorneys March 4, 1924. 1,486,073
J. W. COATES
OIL SUPPLY AND DELIVERY APPARATUS
Filed Jan. 18, 1923    2 Sheets-Sheet 2
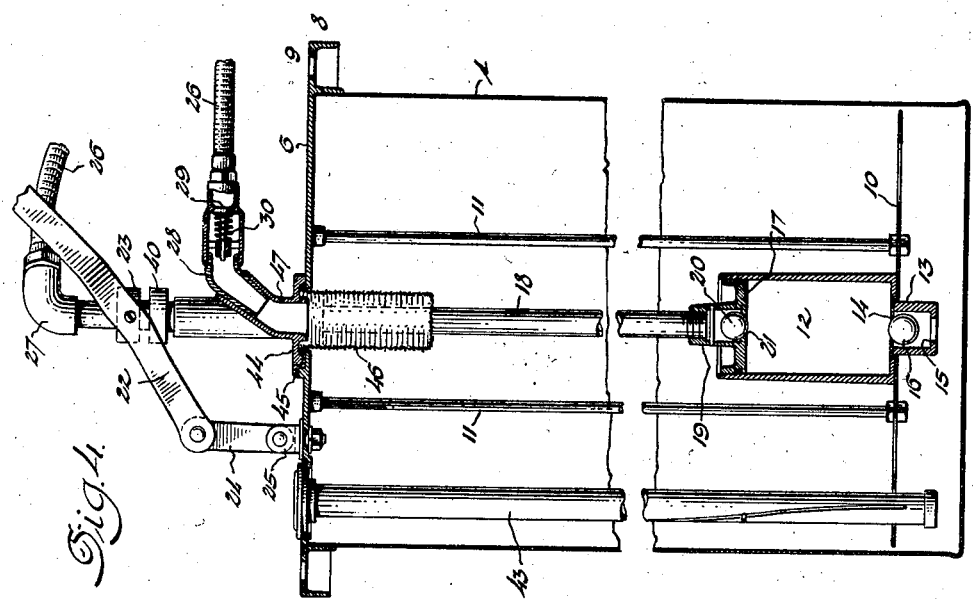
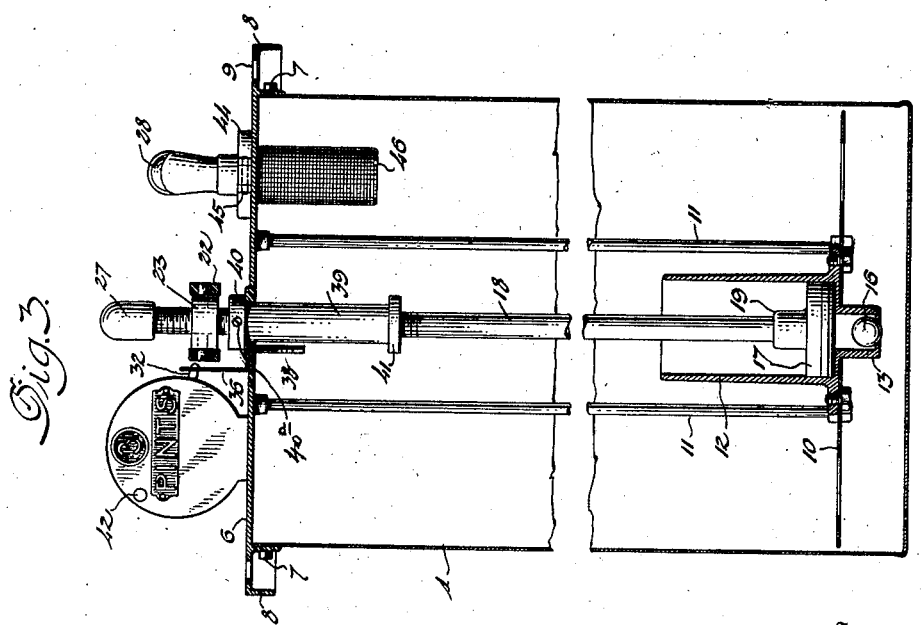
Inventor:
John W. Coates
By
Attorneys Patented Mar. 4, 1924.

1,486,073

UNITED STATES PATENT OFFICE.

JOHN W. COATES, OF DETROIT, MICHIGAN.

OIL SUPPLY AND DELIVERY APPARATUS.

Application filed January 18, 1923. Serial No. 613,403.

*To all whom it may concern:*

Be it known that I, JOHN W. COATES, a citizen of the United States of America, residing at Detroit, in the county of Wayne and State of Michigan, have invented certain new and useful Improvements in Oil Supply and Delivery Apparatus, of which the following is a specification, reference being had therein to the accompanying drawings.

This invention relates to devices for the storage and delivering of lubricants, and more particularly to a device especially designed for use in garages, service stations, and similar places for delivering measured quantities of oil or other lubricant directly to the motors of motor vehicles.

The object of the present invention is to provide a simple and conveniently operated portable device, especially adapted for the purpose and having indicating means for indicating the amount of oil delivered, which indicating means is operated by the means for operating the delivery means, in such a manner that the amount will not be indicated until that amount has been actually delivered. A further object is to provide accurate hand operated delivery means for delivering measured quantities of lubricant, said delivery means including a flexible conduit and discharge nozzle whereby the lubricant may be discharged directly into a motor or other place where it is to be used, and further, to provide a lubricant container fill opening, with a closure adapted to receive and hold the nozzle, when not in use, the fill opening receiving the drip from the nozzle. It is also an object to provide a construction whereby all operating parts are carried by the receptacle top and removable therewith, and certain other new and useful features are provided in the construction and arrangement of parts.

With the above and other ends in view, the invention consists in the matters hereinafter set forth, and more particularly pointed out in the appended claims, reference being had to the accompanying drawings in which—

Figure 1 is a perspective view of a device embodying the invention;

Fig. 2 a plan view of the same;

Fig. 3 a transverse section substantially upon the line 3—3 of Fig. 2;

Fig. 4, a transverse section substantially upon the line 4—4 of Fig. 2;

Fig. 5, a detail showing a delivery pump cylinder and its supporting means in plan view;

Fig. 6 is a detail of indicating mechanism with portions broken away and in section.

A tank of any suitable size or construction forms a receptacle or container for holding a quantity of lubricant such as oil and this tank 1 is preferably removably mounted upon a suitable platform 2 having an opening therein to receive the lower end of the tank with the tank seated upon a bottom plate 3 suspended from the platform beneath the opening. The platform is provided at one end with a caster wheel 4 and at its opposite end with journaled supporting wheels 5 so that the tank may be conveniently moved about from place to place and brought adjacent a motor vehicle or other place where it is desired to deliver a quantity of lubricant.

The top of the tank 1 is tightly closed by a suitable top or cover 6 which is secured in any desired manner to the upper edge of the wall of the tank as by bolts 7 or the like and this top or cover has a projecting rim portion 8 provided with openings 9 which serve as hand-holes by means of which the tank may be moved about upon its wheeled platform or lifted therefrom.

Within the tank near the bottom thereof, is a supporting disk or plate 10 suspended from the cover 6 by means of downwardly extending rods 11 and mounted upon this disk is a cylinder 12 having a valve cage 13 at its lower end extending below the disk and provided with an upper stop 14 and a lower seat 15 for a ball suction valve 16. Within the cylinder 12 is a piston 17 having a tubular piston rod 18 extending upwardly through the tank top 6 and secured at its lower end within a tubular member 19 on the piston, which member forms a chamber for a ball discharge valve 20 adapted to seat upon a seat 21 and stop any flow of fluid back into the cylinder when the piston is moved upwardly and to unseat upon downward movement of the piston and permit the lubricant contained in the cylinder to enter the tubular piston rod. Downward movement of the piston causes the valve 16 to seat upon its seat 15 and trap the lubricant contained in the cylinder, therein, and upon upward movement of the piston, lubricant will be drawn into the cylinder from the tank past the valve 16, filling the cylinder, A measured quantity of fluid is thus delivered upon each upstroke of the piston, the capacity of the cylinder being known.

To operate the piston rod 18 and through its connection with the piston 17 move said piston in its cylinder, a forked handle 22 is pivotally attached to a collar 23 which is internally screwthreaded to engage the screwthreaded upper end of the hollow rod 18 so that said collar may be adjusted upon the rod to adjust the stroke of the handle, and this handle is pivoted at one end to a suitable link 24 which is pivoted at its lower end to an eye member 25 on the tank top, the opposite end of said handle being extended beyond its attachment to the piston rod and provided with a grip portion to be grasped by the operator.

One end of a flexible conduit or hose 26 is rigidly attached directly to the upper end of the tubular piston rod by means of a suitable elbow 27 and the opposite or discharge end of the conduit is provided with a nozzle 28 having embodied therein, as shown on Fig. 4, a valve 29 normally held in closed position by a spring 30, said valve being unseated by the pressure placed upon the fluid in the conduit by the down stroke of the piston 17. Measured quantities of lubricant may therefore be delivered by the nozzle to the motor of a motor vehicle or other place of use by inserting said nozzle in the fill opening of such device, and then by operating the handle 22, force measured quantities of lubricant from the nozzle, the valve 29 operating, at the end of the stroke of the piston, to close the conduit and retain oil therein so that said conduit is always full and ready to discharge immediately upon pressure being put upon the fluid in the conduit by the forcing of a measured quantity from the cylinder into the conduit by the operation of the piston.

To indicate to the purchaser the amount of lubricant delivered to him and to insure the buyer that he is getting the full amount purchased, an indicator, shown in Fig. 6, is mounted upon the tank top adjacent the piston rod, said indicator comprising a dial 31 having figures thereon indicating pints or the like, and this dial is rotated, one step or space at a time to successively bring the indicating figures into view, by an arm 32 carrying or operating a pawl 33 or other suitable means to engage and turn the dial in one direction of rotation only, said dial being normally rotated in an opposite direction by means of a spring 34 or other suitable means. Upon a full stroke or movement of the arm 32 to bring an indicating figure into view, a second pawl 35 or other locking device acts to hold the dial against being turned backward by the spring 34, but should the arm be operated through less than its full stroke, said holding dog 35 will not operate to hold the dial and it will be turned backward by the spring 34 with the retraction or backward or downward swinging of the arm and the partial stroke will not be registered. In like manner if the arm 32 is not swung downwardly to the full limit of its stroke, the dog 33 will not engage the next notch and no registration will take place. Therefore the dial will not register unless a full stroke of the arm is made in both directions, and the buyer will be required to pay for only the amount registered and he is certain that he has received at least that amount, as any partial stroke, while it will deliver oil, will not operate the indicator and the buyer will not therefore be required to pay for it.

Obviously any suitable recording or indicating mechanism may be employed which will operate to indicate only upon full stroke in both directions of its operating means, and this indicating mechanism may be actuated in any suitable manner by movement imparted thereto from the delivery mechanism, but as illustrative of a simple means for swinging the arm 32 by the reciprocation of the piston rod 18, a plate 36 is provided with a slot 37 through which the outer end of the arm 32 projects and this plate is provided with a guide arm 38 extending through a guide opening in the tank top adjacent the piston rod, to have a free vertical sliding movement. On the piston rod 18 is a sleeve 39 adjustable longitudinally thereon by being in screwthreaded engagement therewith and on the upper end of this sleeve above the tank top, is a flange or adjustable stop 40 to engage the plate 36 or upper end of its guide arm 38 and move the plate downwardly upon down stroke of the piston rod, and on the inner or lower end of said sleeve is a flange or stop 41 to engage the lower end of the guide arm 38 and move the plate upwardly upon upstroke of the rod. The flanged sleeve 39 also serves to adjust and limit the stroke of the piston rod and piston as the length of stroke of the rod is limited by the flange coming into engagement with the tank top through which the sleeve slides and by moving this sleeve longitudinally of the rod, the stroke of the piston in its cylinder is adjusted and the quantity of lubricant delivered at each stroke is varied. Any suitable means such as a set screw 40$^a$ may be provided for locking said sleeve or stop in adjusted position, which locking means may be sealed by a sealer of weights and measures to conform with regulations established by law.

The operating arm 32 of the indicator may have a comparatively short stroke or movement, while the length of the reciprocating movement of the piston rod may be comparatively long, and to provide for such difference, lost motion is provided between piston rod or sleeve 39 and operating slide comprising the plate 36 and its guide arm 38, the arm 38 being of lesser length than the distance between the flanges or stops 40 and 41, so that the piston rod may move in either direction a considerable distance before one of the flanges will come into contact with the operating slide and move the same to swing the arm 32.

In the construction of indicator shown, the pawl 35 may have a stem 42 by means of which the pawl may be operated to release it from engagement with the dial and permit said dial to be turned back to zero position by the spring 34, but as previously stated any other suitable form or construction of indicator may be employed.

In the drawings, the device is shown as provided with a suitable form of liquid level gauge which is indicated as a whole by the numeral 43, this gauge being provided to indicate the amount of lubricant contained in the tank. The gauge body is suspended from the tank top 6 by being inserted through an opening in said top with the lower end of the body extended through an opening in the disk or supporting plate 10 to rigidly hold the body in place in the tank and to provide for the removal of the gauge from the tank with the removal of the tank top.

A fill opening is provided in the tank top and this opening is closed by a cover 44 which is hingedly connected at 45 to the tank top at one side of the opening to swing from over the opening, which opening may if desired, be provided with a strainer 46. The fill opening cover is formed with an upwardly extending tubular portion 47 which is internally tapered to form a socket to receive and hold the discharge end of the nozzle 28 so that when not in use, the nozzle may be inserted within this socket to hold the free end of the flexible conduit to which it is attached in suspended or supported position upon the tank and to permit any drip from the nozzle to pass back into the tank through the tubular socket on the fill opening cover, as well as hold the nozzle elevated and thus prevent siphoning of the oil out of the tank. This cover thus performs the functions of a removable closure for the fill opening, a holder for the conduit, and a drip catcher for the nozzle.

The present construction provides a very simple device for the purpose, which may be conveniently moved from place to place to deliver measured and indicated quantities of lubricant directly to motor vehicles or other places of use, and the particular arrangement whereby oil delivery parts are carried by the tank top, facilitates manufacture and repair. The several adjustments provide accuracy of measurement of the lubricant and the manner in which the indicator is operated insures against fraud being practiced upon the buyer who needs only to watch the indicator in order to be sure that he is getting the amount of lubricant paid for, it being impossible to "short stroke" the delivery device and give short measure.

Further, the construction is simple, compact and not liable to get out of order, and waste of lubricant is eliminated through the direct delivery to the place of use through the automatic nozzle valve and as the delivery conduit always remains full of oil the buyer cannot be given short measure by the retention in the conduit of part of the registered amount, as the oil retained in the conduit forms part of the succeeding measured quantity. All drippings from the nozzle are saved by the arrangement of holding socket for the nozzle, and liability of injury to the nozzle or conduit is obviated by the holder which suspends the conduit and positions the nozzle above the tank top to obviate possibility of siphoning and where it may be readily grasped for use.

Obviously, any desired construction of indicator, or nozzle, or of certain other parts may be employed, and variations from the construction shown are contemplated as falling within the scope of the appended claims.

Having thus fully described my invention, what I claim is;—

1. A device of the character described, comprising a tank having a top, a supporting member in the tank near the bottom thereof, means for suspending said member from the tank top, a cylinder carried by said supporting member, a check valve to permit free flow of fluid into the lower end of said cylinder from the tank, a piston in said cylinder, a tubular piston rod for said piston and communicating with the interior of said cylinder through said piston, a check valve to permit free flow of fluid from said cylinder into said rod and to prevent flow of fluid into said cylinder from said rod, an operating handle operatively connected to said piston rod to reciprocate the same, a flexible conduit connected to the outer end of said piston rod, a nozzle member on the free end of said conduit, and a check valve in said nozzle, said valve being normally yieldingly held in closed position to prevent escape of fluid from the conduit and being opened by fluid under pressure within the conduit.

2. In a device of the character described, the combination of a tank having a top, a measuring and delivery cylinder in the tank, a piston in the cylinder, a piston rod for operating the piston and extending through the tank top, an operating handle operatively connected to said piston rod, said handle being pivotally supported upon said tank top, an indicator carried by the tank top and having an operating member projecting toward said piston rod, a vertically movable slide operatively engaged with said operating member, and means on said piston rod above and below said slide to engage and move the same in both directions of movement of said rod.

3. In a device of the character described, the combination of a tank having a top, a cylinder within the tank suspended from the top thereof, a piston in said cylinder, a tubular piston rod extending upwardly through the tank top, an operating handle pivotally mounted on the tank top and operatively connected to said piston rod to reciprocate the same, an operating slide mounted on the tank top, spaced members on the piston rod to engage said slide at the ends of movement of the rod, an indicator comprising a dial, an operating arm to turn said dial in one direction with a step by step movement, a spring to yieldingly turn said dial in a direction opposite to that in which it is turned by said arm, and means for holding the dial in the position to which it is turned by said arm, said arm being operatively engaged with said operating slide to be actuated thereby upon movement of the slide by the piston rod.

4. A device of the character described including in combination, a tank, a top for said tank having an extended rim portion forming a hand hold, a supporting plate within the tank, rods suspending said plate from said top, a cylinder mounted on said plate, a suction valve in the bottom of said cylinder to permit flow of fluid into the cylinder past said valve and prevent the escape of fluid from said cylinder past said valve, a piston in said cylinder, a tubular piston rod, for said piston, a discharge valve on the piston permitting free outflow past said valve into the tubular rod and preventing flow into the cylinder past said valve, said tubular piston rod being extended upward through the tank top and forming the discharge passage from the cylinder, an operating handle pivotally supported on the tank top and operatively connected to said piston rod to reciprocate the same, a sleeve adjustable longitudinally upon said rod and having stroke-end stops, an indicating device mounted on the tank top and provided with an operating arm, a vertically movable operating member operatively engaged with said arm to move the same, said operating member being positioned within the path of movement of said stops of said sleeve, a flexible conduit connected to the upper end of said tubular piston rod, a nozzle on the free end of said conduit, a check valve in said nozzle, and a closure member pivotally connected to said tank top over a fill opening in the top, said closure being provided with a tubular upward extension forming a socket to receive the end of said nozzle.

In testimony whereof I affix my signature in presence of two witnesses.

JOHN W. COATES.

Witnesses:
ANNA M. DORR,
CHARLES W. STAUFFIGER.